United States Patent [19]

Mizuta

[11] Patent Number: 4,900,994
[45] Date of Patent: Feb. 13, 1990

[54] PROTECTION CIRCUIT FOR A POWER WINDOW APPARATUS

[75] Inventor: Ken Mizuta, Miyagi, Japan

[73] Assignee: Alps Electric Co., Ltd., Tokyo, Japan

[21] Appl. No.: 204,450

[22] Filed: Jun. 9, 1988

[30] Foreign Application Priority Data

Sep. 29, 1987 [JP] Japan ................................. 62-242450

[51] Int. Cl.$^4$ ............................................. H02P 1/22
[52] U.S. Cl. .................................... 318/283; 318/286; 318/266
[58] Field of Search ............... 318/263, 265, 266, 267, 318/282, 283, 286, 264, 469, 444; 361/23, 28, 30, 31

[56] References Cited

U.S. PATENT DOCUMENTS

| 4,328,451 | 5/1982 | Barge | 318/469 X |
| 4,347,465 | 8/1982 | Goertler et al. | 318/266 |
| 4,481,450 | 11/1984 | Watanabe et al. | 318/444 |
| 4,628,234 | 12/1986 | Mizuta et al. | 318/264 X |
| 4,641,067 | 2/1987 | Iizawa et al. | |
| 4,712,053 | 12/1987 | Numata | 318/469 X |
| 4,746,845 | 5/1988 | Mizuta et al. | 318/266 X |

Primary Examiner—William M. Shoop, Jr.
Assistant Examiner—A. Jonathan Wysocki
Attorney, Agent, or Firm—Guy W. Shoup; Norman R. Klivans

[57] ABSTRACT

An automatic window glass elevating apparatus for moving a motor normally or reversely by drive control by a switch actuation to move a window glass in a closing or opening direction which has a resistor connected in series with the motor, first detector for detecting the locking time point of the motor from a point for crossing a first waveform signal representing a variation in a potential generated across the resistor by the driving current of the motor and a second waveform signal delayed from the first waveform signal for a first time and added with a first level thereto by obtaining the first waveform signal and the second waveform signal, and second detector for detecting a point for crossing a third waveform signal delayed for a second time from the first waveform signal and subtracted by a second level therefrom and the first waveform signal by obtaining the third waveform signal to enable an automatic operation. Thus, the apparatus can operate an automatic circuit when the motor current decreases in a motor starting range.

3 Claims, 6 Drawing Sheets (A)

(B)

(C)

(D),(E)

(F)

PROTECTION CIRCUIT FOR A POWER WINDOW APPARATUS

BACKGROUND OF THE INVENTION

1. Field of the Invention

This invention relates to a power window apparatus for automobiles and, more particularly, to an automatic window glass elevating apparatus for automatically controlling the elevation of a window glass for a vehicle by detecting the variation in a loading state of a driving motor (hereinafter referred to as "a motor") for opening or closing the window glass.

2. DESCRIPTION OF THE PRIOR ART

In a conventional power window apparatus, a reversible motor for moving a window glass upward in a closing direction and downward in an opening direction is held energized upward or downward by the one-touch operation of a switch. The power window apparatus of this type has an automatic circuit and a switch for automatically moving the window glass upward or downward. When the window glass is in a locked state due to a foreign material interposed between the window glass and a window frame as the window glass is contacted with the window frame in the case that the window glass is moved upward or as the window glass is further moved upward in the case that the window glass arrives at the lower limit, a driving current flowing in the motor increases excessively. Then, detecting means for judging whether the driving current exceeds a reference value or not is provided in the power window apparatus to stop or reversely move the motor by the detection signal of the detecting means.

In such a conventional power window apparatus, a driving current flowing in the motor when the window glass is normally moved upward or downward is largely affected by the influence of the mismatch of the window frame and the window glass or a variation in the terminal voltage of an automotive storage battery as a power source to become remarkably irregular. Thus, the reference value for judging the locking state must be set high.

When the reference value for judging the locking state is high, a large load is applied to the motor when judging the locking state, and it is dangerous because a large holding force is produced between the window glass and the window frame when an arm, fingers or a neck of a human body is interposed partly between the window glass and the window frame. Further, whenever the window glass arrives at the upward or downward limit, a large driving current repeatedly flows in the motor. As a result, there arise drawbacks that the nominal life of the motor is considerably shortened and an automotive storage battery which is the power source may be overdischarged.

FIG. 6 is a waveform diagram of a current in the motor from the start of the motor to the lock of the motor. In FIG. 6, a curve in a starting range (1) indicates the current at the starting time, a curve in an ordinary range (2) indicates the current at the ordinary time, and a curve in a motor lock range (3) is the current at the locking time.

As shown in FIG. 6, the motor current has characteristics that the current is higher at the starting and locking times than during the ordinary range time.

When the starting range (1) can be ignored, the time point when the motor current abruptly rises is judged as the locking state of the motor by utilizing the characteristics of the motor current so as to interrupt the current to the motor.

Since the abrupt rise of the motor current is ignored in the starting range (1) described above, the following method can be employed.

FIG. 7 is a waveform diagram for explaining a method for ignoring the abrupt rise of the motor current in the starting range, where reference character A designates a waveform curve of the motor current converted to a voltage, delayed at t seconds according to the voltage and further added with a value a, and reference character B denotes a waveform curve of the motor current converted to a voltage, and cancelled at the waveform portion (designated by a broken line) at the starting time.

In FIG. 7, a point C where the waveform curve A and the waveform curve B cross is used for the detection of the motor locking time. According to this method, even when the motor current varies due to an irregularity in the characteristics of the motor or a variation in the environment, such as an environmental temperature, the locking time of the motor can be always detected correctly as long as the relationship "locking current larger than ordinary current" is satisfied.

The conventional automatic window glass elevating apparatus of this type is also disclosed in Japanese Patent Laid-open Nos. 39873/1986 and 49086/1986.

In the above-mentioned prior art, when the window glass is located at the uppermost or lowermost position, or at the holding position described above, the abrupt rise of the motor current is detected to stop the motor, but when an automatic circuit for automatically moving the window glass downward as the window glass is disposed at the lowermost position is operated, i.e., when the motor immediately enters a locking state from the starting time, the absolute value of the current flowing in the motor is detected to release the automatic operation if it continues for a predetermined time.

However, according to this method, it has such disadvantages that the predetermined time is required to release the automatic operation and the current continuously flows without releasing the automatic operation according to the characteristic irregularity of the motor causing the motor to be overheated.

SUMMARY OF THE INVENTION

Accordingly, an object of this invention is to provide an automatic window glass elevating apparatus which can eliminate the above-mentioned drawbacks and operates an automatic circuit when a motor current decreases in a motor starting range.

In order to achieve the above and other objects of the invention, as shown in FIG. 3, a detecting voltage C from a motor current obtained by the detecting means of the motor converted to a voltage is delayed by a time t, a waveform D obtained by subtracting the voltage b therefrom is formed, and a voltage of a waveform D is formed when the waveform D and the waveform C cross, the feature that, when the voltage of the waveform D becomes larger than the voltage of the waveform C, the automatic circuit is operated, is provided.

In this arrangement, even if an automatic down operation for automatically moving the window glass downward is executed when the window glass is located at the lowermost position, the motor current enters the state that a detecting voltage waveform C′ obtained from the motor current and a waveform D' obtained by subtracting the voltage b(V) therefrom by delaying it at a time t remain in parallel as designated by C' and D' in FIG. 3 so that the voltage of the waveform D' may not increase larger than the voltage of the waveform C'. Accordingly, the automatic circuit is not operated, and the motor is not overheated.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

An embodiment of the present invention will be described in detail with reference to the accompanying drawings.

Figure 1:
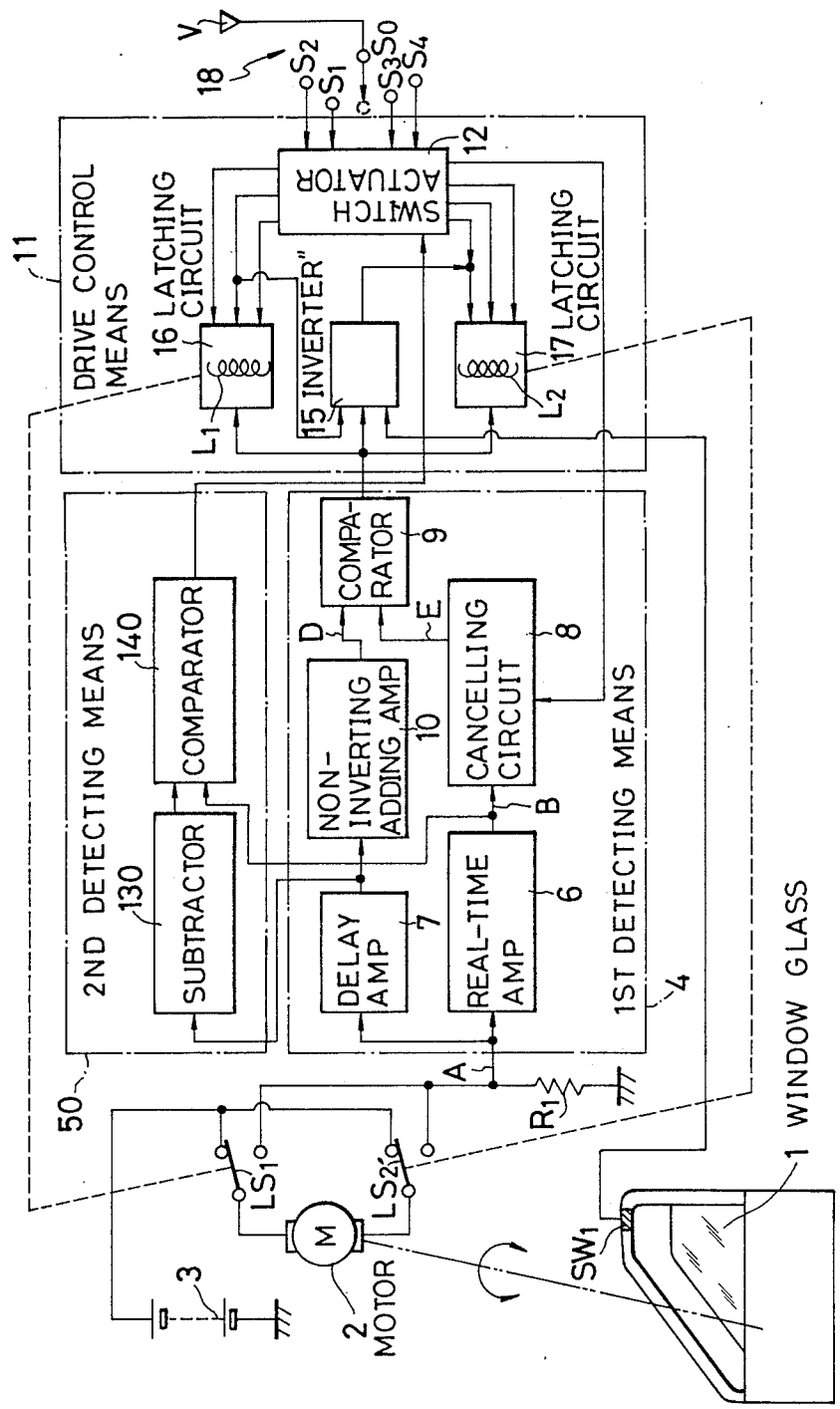
FIG. 1 is a block diagram showing an embodiment of an automatic window glass elevating apparatus according to the present invention.

FIG. 1 is a block diagram showing an embodiment of the present invention. A motor 2 for moving a window glass 1 upward or downward is interposed between a storage battery 3 and a ground to be normally or reversely switched by relay switch contacts $LS_1$ and $LS_2$. Further, a resistor $R_1$ is connected in series with the motor 2 to the ground so that a potential difference across the resistor $R_1$ generated by a driving current flowing in the motor 2 is applied to first detecting means 4.

The first detecting means 4 detects an increase in a load applied to the motor 2 due to the increase in the potential difference. In the first detecting means 4, the potential difference of the resistor $R_1$ is applied to a real-time amplifier 6 and a delay amplifier 7, and the output amplified suitably by the real-time amplifier 6 is applied through a cancelling circuit 8 to one input terminal of a comparator 9. The potential difference of the resistor $R_1$ applied to the delay amplifier 7 is integrated or delayed at a first time, amplified and added with a predetermined added voltage P (first level) by a non-inverting adding amplifier 10, and applied to the other input terminal of the comparator 9. When the window glass 1 normally moves upward or downward, it is so set that the output level of the non-inverting adding amplifier 10 is higher than that of the real-time amplifier 6. Thus, a detection signal is not outputted from the comparator 9, but when the load applied to the motor 2 is increased to cause the potential difference to increase, the output of the real-time amplifier 6 becomes higher than the output level of the non-inverting adding amplifier 10 delayed and amplified to invert the comparator 9, which thus outputs a detection signal. The cancelling circuit 8 eliminates the transmission of the output of the real-time amplifier 6 to the comparator 9 for a predetermined time at the time of starting the motor 1 by a signal from a switch actuator 12 of drive control means 11, thereby preventing an erroneous detection from occurring due to the starting current.

Second detecting means 50 comprises a subtractor 130 for subtracting a subtracted voltage P' (bV—second level in FIG. 3) from the output voltage of the delay amplifier 7, and a voltage comparator 140 for comparing the output level of the subtractor 130 with the output level of the real-time amplifier 6. The output of the second detecting means 50 cooperates with the automatic down switch of the switch actuator 12 to increase the load applied to the motor 2 when the automatic down switch is depressed, and starts the automatic down operation when it exceeds the output level of the real-time amplifier 6, i.e., when the waveform D exceeds the waveform C in FIG. 3 (indicated by a round mark in the hatched range).

The detection signal from the first detecting means 4 is applied to the inverter 15 of the drive control means 11 and first and second latching circuits 16, 17. The signal of a normally closed inversion switch $SW_1$ mounted in the window frame and opened when the window glass 1 is disposed in the vicinity of the upward limit is applied to the inverter 15. The first latching circuit 16 continuously drives a relay coil $L_1$ temporarily or by a self-holding according to a command of the switch actuator 12, controls the relay switch contact $LS_1$ to move the window glass 1 upward, and releases its self-holding by the detection signal of the first detecting means 4. The second latching circuit 17 continuously drives a relay coil $L_2$ temporarily or by a self-holding according to a command of the switch actuator 12, controls the relay switch contact $LS_2$ to move the window glass 1 downward, and releases the self-holding by the detection signal of the first detecting means. While the window glass 1 is being raised and the inversion switch $SW_1$ is opened, the inverter 15 controls the second latching circuit 17 to move the window glass 1 downward when the detection signal of the first detecting means 4 is applied to the inverter 15. The self-holding of the first latching circuit 16 is released at this time.

Further, the switch actuator 12 applies a command to the first and second latching circuits 16, 17 and the cancelling circuit 8 in response to the operation of an actuator switch 18. The actuator switch 18 is of seesaw momentary operation type, has four contacts $S_1$ to $S_4$ opened when it is not operated, connected to the switch actuator 12, and a common contact $S_0$ connected to a voltage terminal and applied with a voltage thereto. The contact $S_1$ is for manually moving the window glass upward only when the window glass is manually opened, the contact $S_2$ is for automatically moving continuously the window glass upward even if the operation is released if the window glass is once closed, the contact $S_3$ is for manually moving the window glass downward only while the window glass is manually closed, and the contact $S_4$ is for automatically moving the window glass downward continuously even if the operation is released if the window glass is once closed. The actuator switch 18 is not limited to the seesaw momentary operation type, but may be of a slide operation type, a pushing type or a rotary operation type.

Then, a circuit arrangement and is operation will be described in detail with reference to FIGS. 2, 3, 4 and 5.

Figure 2:
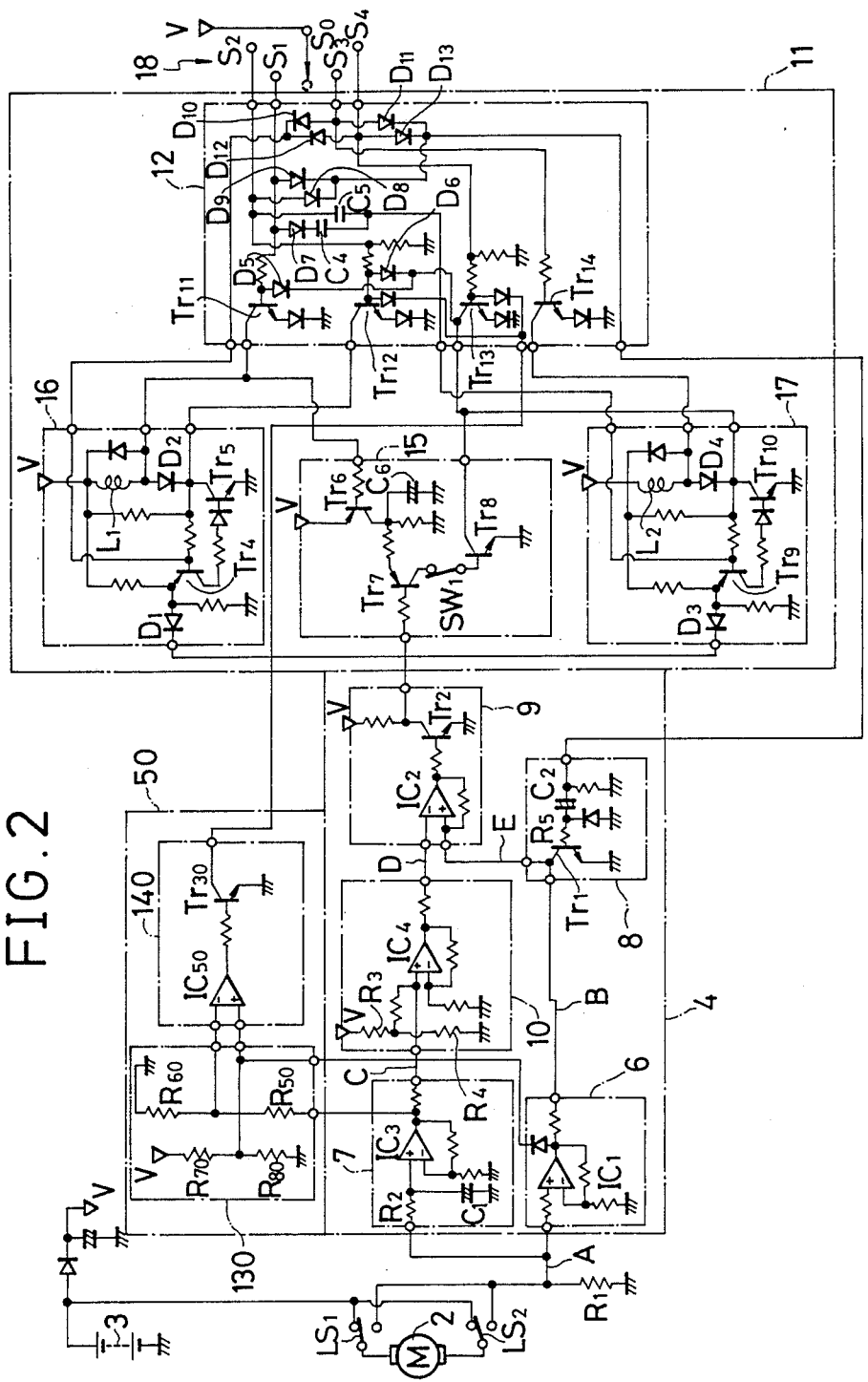
FIG. 2 is a circuit diagram of FIG. 1.

In FIG. 2, when the contact $S_1$ for manually moving the window glass upward and the common contact $S_0$ are closed by the operation of the actuator switch 18, a transistor $Tr_{11}$ is conducted, a current flows to the relay coil $L_1$ of the first latching circuit 16 to be controlled, and the motor 2 i rotated in a direction for moving the window glass 1 upward. Then, the voltage applied to the contact $S_1$ is differentiated through a diode $D_7$ by a capacitor $C_4$, this pulse is applied to the base of a transistor $Tr_9$ of the second latching circuit 17, and when the second latching circuit 17 is self-held, it is released. The voltage applied to the contact $S_1$ is applied through a diode $D_9$ to the cancelling circuit 8 of the first detecting means 4 to conduct the transistor $Tr_1$ for a period t set by the time constant of a resistor $R_5$ and a capacitor $C_2$, thereby stopping the detecting operation of the first detecting means 4 for the period t. When the closing operation is released, the transistor $Tr_1$ is interrupted, no current flows to the relay coil $L_1$, the relay switch contact $LS_1$ is reset to stop the motor 2. A transistor $Tr_4$ is not conducted by a diode $D_2$, and the first latching circuit 16 is not self-held.

When the contact $S_2$ for automatically moving the window glass upward and the common contact $S_0$ are closed, a transistor $Tr_{12}$ is rendered conductive, and a current flows to the relay coil $L_1$. A transistor $Tr_4$ is rendered conductive by the conduction of the transistor $Tr_{12}$, and a transistor $Tr_5$ is further rendered conductive to self-hold the first latching circuit 16. Thus, even if the operation is released, the current continuously flows to the relay coil $L_1$, and the motor 2 is continuously rotated in a direction for moving the window glass 1 upward. The voltage applied to the contact $S_2$ is differentiated by a capacitor $C_5$ and so applied to the base of a transistor $Tr_9$ as to release the self-holding of the second latching circuit. Further, it is applied to a diode $D_8$ to the cancelling circuit 8 to stop the detecting operation of the first detecting means for a period t.

When the contact $S_3$ for manually moving the window glass downward and the common contact $S_0$ are closed, a transistor $Tr_{14}$ is rendered conductive, a current flows to the relay coil $L_2$ of the second latching circuit 17, the relay switch contact $LS_2$ is controlled, and the motor 2 is rotated in a direction for moving the window glass 1 downward. Then, the voltage applied to the contact $S_3$ is so applied through a diode $D_{10}$ to the base of the transistor $Tr_4$ as to release the self-holding of the first latching circuit 16. Further, it is applied through a diode $D_{11}$ to the cancelling circuit 8 to stop the detecting operation of the first detecting means for a period t. When the closing operation is released, the transistor $Tr_{14}$ turned off is, no current flows to the relay coil $L_2$, the relay switch contact $LS_2$ is reset, and the motor 2 is stopped. The transistor $Tr_9$ is turned off by a diode $D_4$, and the second latching circuit 17 is not self-held.

When the contact $S_4$ for automatically moving the window glass downward and the common contact $S_0$ are closed, a transistor $Tr_{13}$ is rendered conductive, and a current flows to the relay coil $L_2$. Then, the transistors $Tr_9$, $TR_{10}$ are together rendered conductive, and the second latching circuit 17 is self-held. Thus, even if the operation is released, the current flows to the relay coil $L_2$, and the motor 2 is continuously rotated in a direction for moving the window glass 12 downward. Further, the voltage applied through a diode $D_{12}$ to the contact $S_4$ is so applied to the base of the transistor $Tr_4$ as to release the self-holding of the first latching circuit 16. Then, it is applied through a diode $D_{13}$ to the cancelling circuit 8 to stop the detecting operation of the first detecting means for a period t.

As described above, when either one of the relay switch contacts $LS_1$ and $LS_2$ is controlled, a driving current flows to the motor 2, and a potential difference is generated across the resistor $R_1$. Then, the motor 2 is rotated, and the potential difference generated across the resistor $R_1$ by the driving current of the motor 2 becomes a starting waveform (1) by the starting current of large current value at the starting time, then an ordinary waveform (2) by the ordinary rotation, and a locking waveform (3) due to the increase in the driving current owing to the increase of the load to enter a locking state when arriving at the upper limit or the lower limit or when a foreign material is interposed between the window glass 1 and the window frame, in FIG. 4(A).

Figure 4:
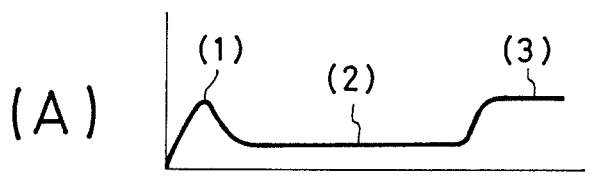
FIGS. 4 and 5 are waveform diagrams for explaining the operation of the invention.
Figure 4:
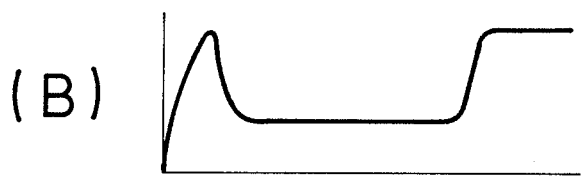
Figure 4:
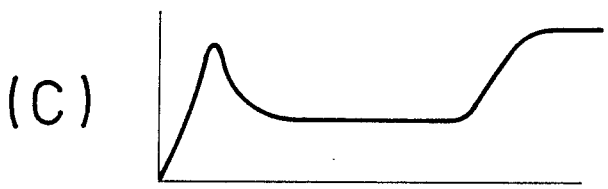
Figure 4:
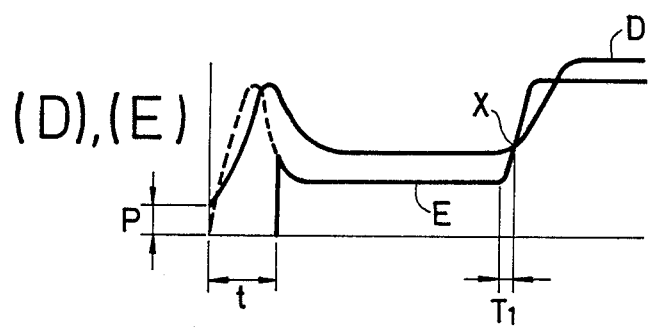
Figure 4:
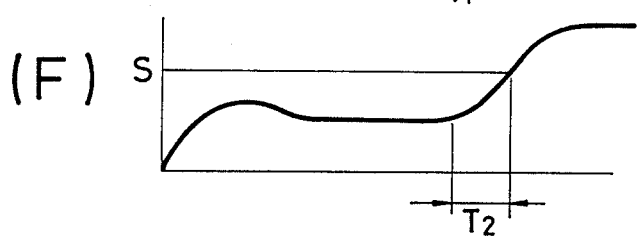
Figure 5:
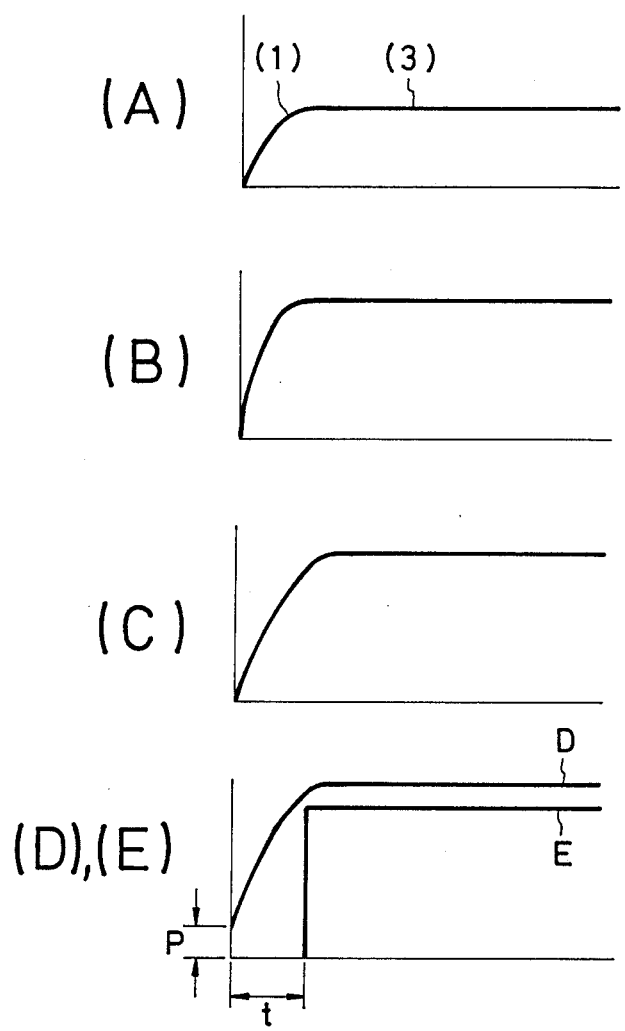
Figure 6:
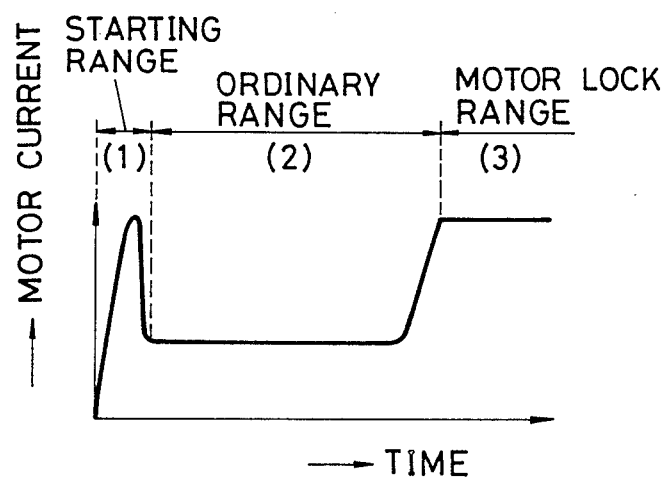
FIGS. 6 and 7 are waveform diagrams for explaining the prior art.
Figure 7:
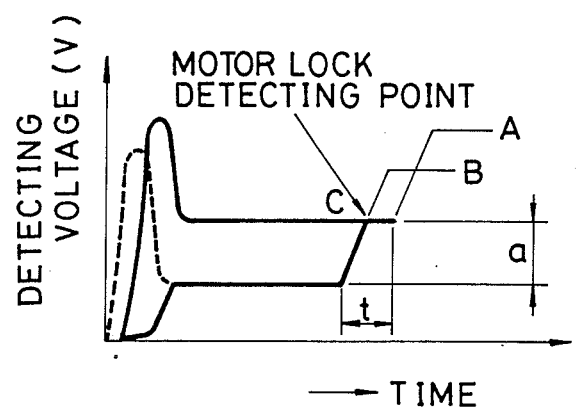

The first detecting means 4 will be first described. The real-time amplifier 6 to which the potential difference of the resistor $R_1$ is applied has an amplifier $IC_1$, which applies the amplified output (a signal of first waveform) to the cancelling circuit 8 without delay as in FIG. 4(B). The cancelling circuit 8 forcibly rendered conductive the transistor $Tr_1$ by the operation of the actuator switch 18 only for the period t, and applies the output of the real-time amplifier 6 except for the period t at the starting time to the comparator 9. The potential difference across the resistor $R_1$ applied to the delay amplifier 7 is integrated by an integrator made of a resistor $R_2$ and a capacitor $C_1$, amplified by an amplifier $IC_3$, and the output which is delayed at a first time with respect to the increase in the potential difference as shown in FIG. 4(C) is applied to the non-inverting adding amplifier 10. The non-inverting adding amplifier 10 adds the addition voltage P (first level) divided by the resistor $R_2$ and $R_4$ to the output of the delay amplifier 7 by an adder $IC_4$, and the output as shown in FIG. 4(D) is applied to the comparator 9. The addition voltage P is so set that the output voltage of the non-inverting adding amplifier 10 is higher than the output of the real-time amplifier 6 (of the cancelling circuit 8) during a period that the potential difference of the resistor $R_1$ exhibits the ordinary waveform (c). When the motor 2 is locked so that the load of the motor 2 is increased to cause the potential difference to increase, the output of the real-time amplifier 6 (of the cancelling circuit 8) rises abruptly as shown in FIG. 4(E), but the output of the non-inverting adding amplifier 10 is delayed at the rise as shown in FIG. 4(D), the amplitude of the potential is inverted at a time point X of the period $T_1$ from when the potential difference starts increasing in FIG. 4 to invert the output of the comparing amplifier $IC_2$ of the comparator 9, thereby rendering conductive a transistor $Tr_2$. The collector potential of the transistor $Tr_2$ is outputted as the detection signal of the first detecting means 4 to the drive controller 11.

When the actuator switch 18 is so operated erroneously in a locking direction as to move the window glass upward at the upper limit position in the state that a foreign material is held or downward at the lower limit position further from the state that the window glass 1 is disposed at the upper limit or lower limit position or a foreign material is interposed between the window glass 1 and the window frame to be stopped and locked, a large load is applied to the motor 2, the potential difference of the resistor $R_2$ enters immediately the locking state (3) from the starting waveform (1) as shown in FIG. 5(A). Thus, as shown in FIGS. 5(D) and 5(E), the output of the non-inverting adding amplifier 10 cannot exceed the output of the real-time amplifier 6 (of the cancelling circuit 8), and the first detecting means 4 cannot detect the locking state.

FIGS. 5(B) and 5(C) show respectively the outputs of the real-time amplifier 6 and the delay amplifier 7.

Figure 3:
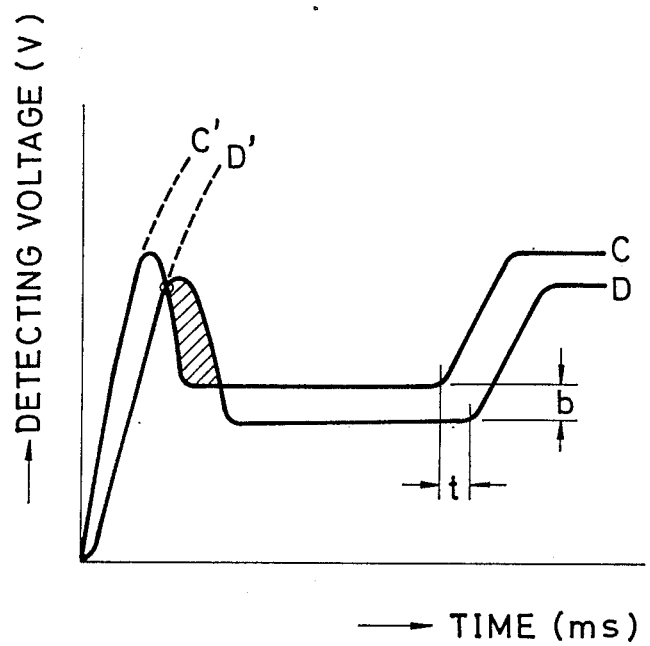
FIG. 3 is an explanatory view of a principle of the present invention.

Then, in order to detect this locking state, the second detecting means 50 inputs the output (signal of first waveform) of the real-time amplifier 6 to one input terminal of the comparator 140, delays the detection output C for a second time t as shown in FIG. 3 by the delay amplifier 7, and inputs the output D subtracted by the second level b (signal of third waveform) by the subtractor 130 to the other input terminal of the comparator 140.

Since the comparator 140 is so constructed as to apply an automatic operation enable signal to the switch actuator 12 through a transistor $Tr_{30}$ when the inputted signal D exceeds the signal C (when both the signals shown by a round mark in FIG. 3 cross) to conduct the transistors $Tr_{12}$, $Tr_{13}$, even if the automatic down switch is depressed when the window glass is, for example, disposed at the lower limit, the output C of the real-time amplifier 6 and the output D of the delay amplifier 7 do not cross as shown by C' and D' in FIG. 3 at the input of the comparator 140. Thus, the automatic down operation does not start. Since the second delay time t by the delay amplifier 7 is set to 200 to 300 msec., even if the automatic down switch is depressed to cause the motor to operate, when this set time is elapsed, the motor is stopped, and a defect, such as an overheat of the motor due to an increase in the load can be prevented.

The operation of the drive control means 11 to which the detection signals of the first and second detecting means 4, 50 are applied will be described in detail.

When a foreign material is held between the window glass 1 and the window frame to apply a detection signal while the contact $S_1$ for manually moving the window glass upward is closed, the transistor $Tr_7$ of the inverter 15 is rendered conductive. A transistor $Tr_8$ is rendered conductive by the charging current of a capacitor $C_6$ flowing through the inversion switch $SW_1$ by the conduction of the transistor $Tr_7$, the base of the transistor $Tr_1$ is grounded through a diode $D_5$ to be forcibly turned off, and the motor 2 stops rotating in a direction for moving the window glass 1 upward. Further, a current flows to the relay coil $L_2$ of the second latching circuit 17 by the conduction of the transistor $Tr_8$, the motor 2 is inverted to move the window glass 1 downward. A transistor $Tr_6$ of the inverter 15 is rendered conductive to charge the capacitor $C_6$ while the transistors $Tr_{11}$, $Tr_{12}$ are rendered conductive.

When a foreign material is interposed between the window glass 1 and the window frame so that a detection signal is applied while the contact $S_2$ for automatically moving the window glass upward is once closed, and the closing operation is already released to form the self-holding of the first latching circuit 15, the first latching circuit 16 reduces the collector potential of the transistor $Tr_4$ through a diode $D_1$ to turn off the transistor $Tr_4$. Thus, a transistor $Tr_5$ is turned off to shut off a current to the relay coil $L_1$, thereby stopping the motor 2. Further, a current flows to the relay coil $L_2$ of the second latching circuit 17 by the conduction of a transistor $Tr_3$ of the inverter 15 to invert the motor 2, thereby moving the window glass 1 downward. When the detection signal is applied while the contact $S_2$ for automatically moving the window glass upward is closed, the base of the transistor $Tr_{12}$ is grounded through a diode $D_6$ by the conduction of the transistor $Tr_8$ to be forcibly turned off, and the collector potential of the transistor $Tr_4$ of the first latching circuit 16 is reduced, the self-holding is not formed, and the current of the relay coil $L_1$ is interrupted.

Here, when the window glass 1 approaches the window frame to rise to the position where no foreign material can be interposed between the window glass 1 and the window frame to open the inversion switch $SW_1$ and the window glass 1 arrives at the upper limit where the window glass 1 is contacted with the window frame to apply a detection signal, the self-holding of the first latching circuit 16 is released to stop the drive of the motor 2 for moving the window glass upward. Then, the inverter 15 keeps the transistor $Tr_9$ nonconductive by the opening of the inversion switch $SW_1$, the motor 2 is not inverted by the second latching circuit 17, and the window glass 1 is contacted with the window frame to be stopped.

When the contact $S_4$ for automatically moving the window glass downward is once closed, the closing operation is already released, the self-holding of the second latching circuit 17 is formed, and the window glass 1 arrives at the lower limit to apply a detection signal, the collector potential of the transistor $Tr_9$ is reduced through a diode $D_3$ of the second latching circuit 17, the self-holding is released to stop the motor 2, and the window glass 1 is stopped at the lower limit. When the detection signal is applied while the contact $S_4$ for automatically moving the window glass downward is closed, the collector potential of the transistor $Tr_9$ of the second latching circuit 17 is reduced, and the self-holding is not formed.

Since the transistor $Tr_8$ of the inverter 15 is rendered conductive and the collector potential of the transistor $Tr_9$ of the second latching circuit 17 is reduced through the diode $D_3$ while the detection signal is applied to the drive control means 11, the self-holding of the second latching circuit 17 is not always formed. Then, in order to continue the downward movement of the window glass 1 by forming the self-holding by the second latching circuit 17 when a foreign material is interposed between the window glass and the window frame during the upward movement, a capacitor may be interposed, for example, between the base of the transistor $Tr_8$ and the ground to delay the inversion of the transistor $Tr_8$ to the nonconductive state by the rise of the collector potential of the transistor $Tr_9$ due to the erasure of the detection signal. In the embodiment described above, the invention has been described with respect to the automatic window glass elevating apparatus for moving the window glass 1 upward or downward. However, this apparatus may also be used as a power window apparatus for moving a window provided at a roof, called "sunroof" (or "a moonroof") by a drive motor which has recently prevailed. Further, the delay amplifier 7 shown in FIG. 2 has the integrator of the resistor $R_2$ and the capacitor $C_1$, but may be formed of any other suitable delay circuit.

According to the automatic window glass elevating apparatus of the present invention as described above, the first detecting means for detecting the increase in the load applied to the motor is provided. Therefore, the locking state of the motor can be detected by the increase in the driving current of relatively small value without influence of the displacement of the window glass with respect to the window frame, and even if a foreign material is interposed between the window glass and the window frame, it is safe without applying a large holding strength. Further, since the locking state of the motor can be detected by the small driving current to stop or invert the motor, large driving current does not flow to the motor whenever the window is closed and arrives at the opening limit, to increase the nominal life of the motor and to reduce the discharge of the storage battery of the power source. Further, since the second detecting means for detecting that the load applied to the motor decreases within a predetermined time is provided, even if the motor is locked and the switch is actuated erroneously in the locking direction, the locking state of the motor can be immediately detected, the self-holding is not so formed as to continuously feed the driving current to the motor by the drive control means, thereby providing no possibility of burning out the motor.

What is claimed is:

1. A power window device comprising:
   a window glass set in a window frame;
   a motor rotatable in two opposite directions operably connected to open and close said window glass in response to a driving current provided to said motor;
   drive controlling means for controlling said driving current;
   a switch connected to said motor, said switch being actuated for opening and closing said window;
   energization current sensing means for detecting a value of said driving current;
   first sensing means for sensing an object being held between said window glass and said window frame, by comparing said value of said driving current to a delayed value of said driving current, said first sensing means being inoperative for a predetermined time after an actuation of said switch;
   reversing means included in said drive controlling means for reversing a direction of rotation of said motor for a predetermined time in response to said first sensing means;
   second sensing means for sensing that said window glass is fully opened or fully closed in said window frame by comparing said value of said driving current to a delayed value of said driving current; and
   switch controlling means included in said drive controlling mean for overriding said switch and preventing provision of said driving current to said motor, in response to said second sensing means.

2. The device of claim 1, wherein said energization current sensing means comprises a resistor, and said first detecting means comprises:
   a real time amplifier for amplifying a voltage across said resistor;
   a delay amplifier for delaying and amplifying an output of said real time amplifier;
   a non-inverting amplifier for adding a value to an output of said delay amplifier;
   a comparator for comparing an output of said non-inverting amplifier to an output of said real time amplifier; and
   a cancelling circuit for preventing transmission of the output of said real time amplifier to said comparator for a predetermined time when said motor starts rotating,
   whereby when a mechanical load on said motor increases, thereby increasing the voltage across said resistor, the output of said real time amplifier exceeds said output of said non-inverting amplifier, so as to invert said comparator.

3. The device of claim 1, wherein said second detecting means comprises:
   a subtractor for subtracting a voltage from said output of said delay amplifier; and
   a voltage comparator for comparing an output of said subtractor to an output of said real time amplifier.

* * * * *